Sept. 29, 1942.    G. Z. VON MANTEUFFEL    2,297,265
GYROSCOPIC INSTRUMENT
Filed Aug. 1, 1938    2 Sheets—Sheet 1

Inventor:
G.Z.v.Manteuffel
By A.D.Adams
Attorney

Sept. 29, 1942.   G. Z. VON MANTEUFFEL   2,297,265
GYROSCOPIC INSTRUMENT
Filed Aug. 1, 1938   2 Sheets—Sheet 2

Inventor:
G. Z. v. Manteuffel
By A. D. Adams
Attorney

Patented Sept. 29, 1942

2,297,265

UNITED STATES PATENT OFFICE 2,297,265

GYROSCOPIC INSTRUMENT

Gert Zoege von Manteuffel, Berlin-Dahlem, Germany; vested in the Alien Property Custodian Application August 1, 1938, Serial No. 222,563
In Germany August 2, 1937

7 Claims. (Cl. 74—5)

This invention relates to an erecting device for a free gyroscope suspended in gimbals with substantially neutral equilibrium, more particularly to an electrically driven gyro-vertical for aircraft.

In order to return the gyroscope in case of deviations to the vertical by precession movements it is common practice to use air jets, controlled in dependence on the apparent vertical, which jets act upon the gimbal system. In the case of air-driven gyroscopes the driving air may serve for this purpose, in the case of electrically driven gyroscopes the controlling air jets must first be created, for which purpose the turbine effect of the gyro rotor can be used.

Whilst in air-driven gyroscopes the controlling air jets are already fully effective when the gyro rotor is set in motion and cause an immediate return of the gyro spin axis into the vertical, electrical gyroscopes start slowly in an arbitrary position, because of the absence of effective controlling forces, and settle into the vertical only after the controlling air jets have become fully effective on full speed of the gyro rotor. It may be desirable, however, to provide also air-operated instruments with an additional erecting means to bring the rotor spin axis into its normal position.

Therefore gyro-verticals used in aircraft have been equipped with locking devices which permit adjusting of the gyro spin axis parallel to the vertical axis of the aircraft. In the take-off position most airplanes have an inclination of about 15° against the horizontal so that the orientation of the axis of a gyroscope locked by means of such a device is different in the same amount from the direction of the of the vertical. When a gyroscope is started in this position, a considerable time will elapse until the rotor axis is vertical.

The general object of this invention is to provide an additional means to vertically align the gyro spin axis when starting the gyro rotor during an attitude of the craft inclined with respect to its attitude in normal flight.

Further aims, objects, and advantages will appear from a consideration of the description, as well as the accompanying drawings showing an embodiment of the invention for illustrative purposes.

Figure 1:
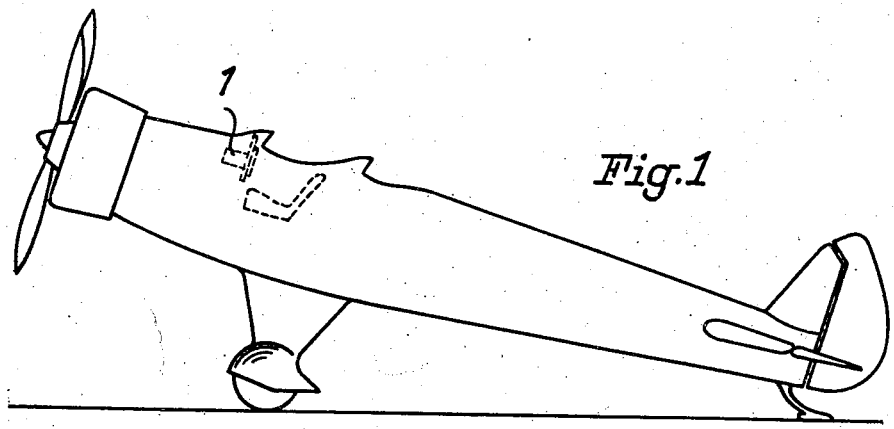
Fig. 1 shows the inclined position of the gyro-vertical in the take-off position of the aircraft.
Figure 2:
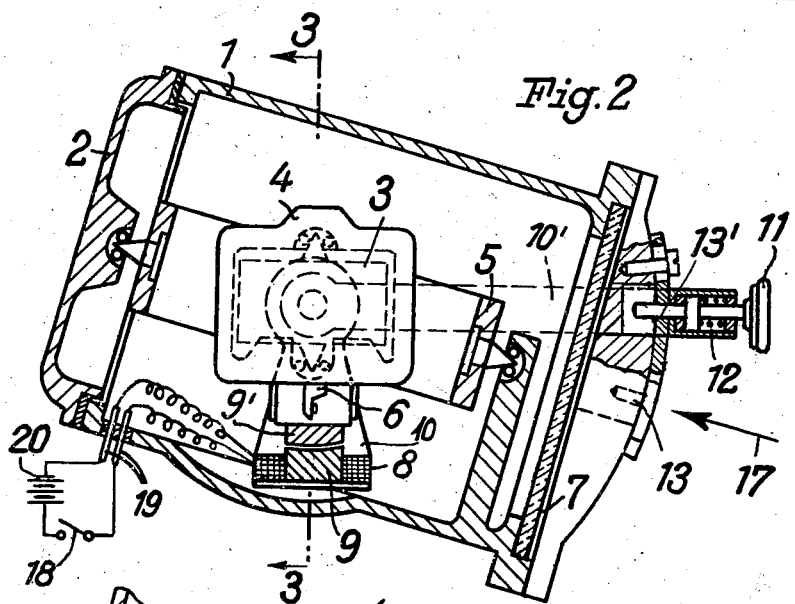
Fig. 2 is a vertical longitudinal section of an embodiment of the gyroscope.
Figure 5:
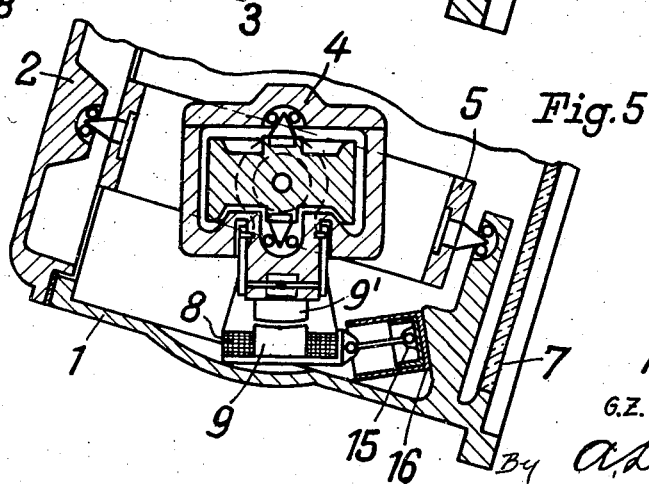
Fig. 5 shows a longitudinal section of a further embodiment of the additional erecting device.
Figure 3:
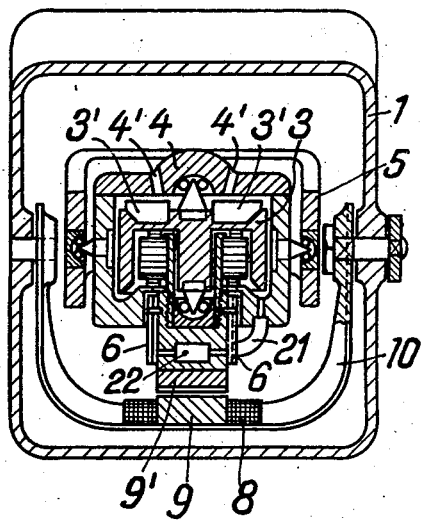
Fig. 3 illustrates a section along the line 3—3 in Fig. 2.

In the figures 1 is the casing of the gyroscopic instrument which is also illustrated in Figures 2, 3 and 5 in the inclined position of Fig. 1. In the casing 1, which is closed by means of the back cover 2, the electrically driven gyro rotor 3 is in substantially neutral equilibrium on the spinning axis support 4 and the cardan frame 5. For keeping the gyroscope vertical pendulum shutters 6 are used. Four shutters are provided controlling air jets in a well-known manner. The differential air pressure is generated by the turbine effect of the gyro rotor 3 which is provided with blades 3' (Fig. 3) serving to suck air into the gyro casing through holes 4', which air is guided through a tube 21 into a hollow space 22 wherefrom the air issues according to the position of the pendulum shutters 6 so as to keep the spin axis vertical.

The gyroscope may be provided in a well-known manner with indicating members and controlling transmitters which are not illustrated in the figures for reasons of simplicity. The indicating members can be observed through the cover glass 7.

For erecting the gyro spin axis when starting the rotor an electromagnetic coupling is used in the embodiment shown. The pivotally mounted bail or frame 10 provides a mounting for an iron core 9 around which is wound a coil 8. Opposite the core 9 of the electromagnet is an iron piece 9' attached to the casing of the gyro rotor. The ends of the coil 8 are attached to terminals 19 which are connected with a switch 18 and a battery 20, respectively. On closing the switch 18 the core 9 is magnetized and the iron piece 9' attracted.

Figure 4:
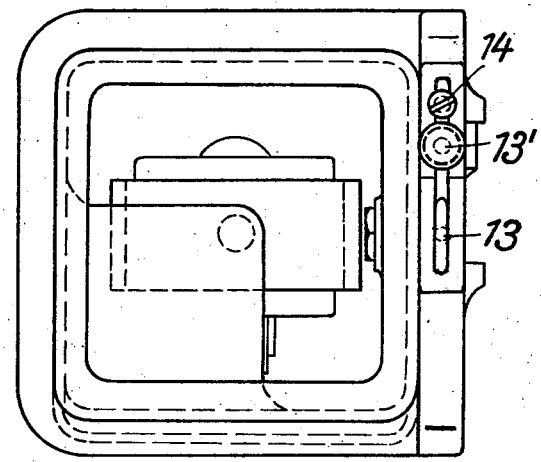
Fig. 4 represents the instrument from the front and permits details of the additional erecting device to be recognized.

As noted in Figs. 2 to 4, inclusive, the frame 10 includes a lever 10' that extends perpendicularly therefrom which is provided with an adjusting knob 11 situated exteriorly of the housing 1. Any movement of lever arm 10' consequently results in a corresponding pivotal movement of frame 10 with the electromagnetic parts 8—9 mounted thereon. The knob 11 may be pulled out against the action of a spring 12 and brought into the borings 13, 13', respectively. The position 13 corresponds to the position of normal flight indicated by the arrow 17, the illustrated position 13' corresponding to the take-off position of the aeroplane. The angle between the two borings 13 and 13' is suitably made adjustable so that the instrument may be adapted to aircrafts with different inclination in the take-off position. After loosening the screw 14 (compare Fig. 4) the boring 13' may be adjusted with respect to the casing, whilst the boring 13 is fixed to the same.

An electromagnet 8, 9 is used also in the somewhat different embodiment in Fig. 5 to erect the gyro rotor, but in this case the arrangement is pendulous and provided with a damping device. This device consists of a piston 15 which is attached to the pendulous electromagnet and is movable in a cylinder 16 fixed to the instrument casing. It is advisable to make the damping relatively strong as sufficient time is available to let the erecting device swing into the vertical. A strong damping has the advantage that momentary strong reaction forces can be taken up when erecting the gyroscope without a noticeable displacement of the erecting device. Furthermore, during flight short disturbances are not transmitted to the pendulum arrangement.

In accordance with the provisions of the patent statute, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

What is claimed is:

1. In a gyro-vertical for aircraft, an outer housing, a rotor, means for driving the rotor, a rotor bearing casing, means for supporting the casing in said housing for movement about normally horizontal major and minor trunnion axes at right angles to the rotor spin axis, means for normally erecting the rotor bearing casing, and means for positioning the casing during starting up periods of operation of the gyro-vertical comprising an auxiliary member pivoted to the housing, electromagnetic means comprising a first means on said member and a second means on said rotor bearing casing coacting with each other for aligning the said member and casing, and means situated exteriorly of the housing for setting said pivotal auxiliary member so that through the cooperation therewith of said electromagnetic means the rotor spin axis of the rotor bearing casing is substantially vertically positioned regardless of the fore and aft inclination of the aircraft with respect to the ground.

2. In a gyro-vertical for aircraft, an outer housing, a rotor, means for driving the rotor, a rotor bearing casing, means for supporting the casing in said housing for movement about normally horizontal major and minor trunnion axes at right angles to the rotor spin axis, means for normally erecting the rotor bearing casing, a bail ring mounted within said housing on an athwartship positioned axis and including a lever arm extending exteriorly of the housing from the ring, electromagnetic means comprising a first means on said bail ring and a second means on said rotor bearing casing coacting with each other for aligning the said ring and casing when desired, and means for setting the extended portion of the lever arm with respect to the housing so the rotor bearing casing may be maintained in a position in which the rotor spin axis is substantially vertical through the influence of said electromagnetic means during initial periods of operation of the gyro-vertical.

3. A gyro-vertical according to claim 2, in which the setting means for the bail ring lever arm provided on the housing makes provision for locating the arm in either of two positions only which correspond to the take-off and normal flight positions of the aircraft.

4. In a gyro-vertical for aircraft, an outer housing, an electrically driven rotor, a rotor bearing casing, means for supporting the casing in said housing for movement about two normally horizontal axes at right angles to the rotor spin axis, air jet means for normally erecting the rotor bearing casing, a pendulous device mounted within said housing for movement about an athwartship axis thereof, electromagnetic means for aligning the said device and casing comprising a first means on said pendulous device and a second means on said rotor bearing casing, and means for damping the movement of said pendulous device to prevent sudden changes in the position thereof with relation to the housing so the influence of the electromagnetic aligning means maintains the rotor spin axis of the rotor bearing casing in a substantially vertical position.

5. A gyro-vertical for aircraft comprising a gyroscope having a casing, a gimbal mounting for supporting the gyro casing with neutral equilibrium and freedom to move about fore and aft and athwartship horizontal axes, means for precessing the gyro casing upon departure thereof from a vertical position, a member pivoted about an athwartship axis in line with the aforesaid athwartship axis, an electromagnet aligning means comprising two parts, of which one is attached to said casing and the other of which is connected to said member, and means for setting said member in either of two positions corresponding respectively to the take-off and the normal flight positions of the aircraft.

6. In a gyro-vertical for aircraft having an outer housing, an electrically driven rotor, a casing for the rotor, a gimbal ring in said housing for supporting said rotor casing with neutral equilibrium and freedom to move about two horizontal axes, means operated through pneumatic pressure generated by the rotation of said rotor for normally maintaining the spin axis of the rotor in a vertical position, a lever system for the gyro-vertical settable from the outside of the housing, and means for aligning the lever system and rotor casing to vertically position the spin axis of the rotor at the initial period of operation of the rotor regardless of the inclined take-off attitude of the aircraft with respect to the ground, said aligning means comprising two parts, one being situated in the lever system and the other in the rotor casing.

7. In a gyro-vertical for aircraft, an outer housing, a gyroscope having a casing, means for supporting the casing in said housing for movement about two normally horizontal axes, means for normally maintaining the casing in an erected position, a pendulous bail ring pivoted in said housing about an athwartship axis so as to underlie the gyroscope casing, means for aligning said casing and ring comprising two parts, one of which is mounted on said casing and the other of which is mounted on said ring, and damping means between said pendulous ring and housing adapted to take up reactive forces exerted by the gyroscope.

GERT ZOEGE von MANTEUFFEL.